US011469636B2

(12) United States Patent
Hackl et al.

(10) Patent No.: US 11,469,636 B2
(45) Date of Patent: Oct. 11, 2022

(54) ELECTRIC MOTOR WITH A STATOR FORMED FROM A POLE CHAIN AND WITH CONTACTLESS ROUTING OF ENAMELED ALUMINUM WIRE

(71) Applicant: Bleckmann GmbH & Co. KG, Lamprechtshausen (AT)

(72) Inventors: Heinz Frederic Hackl, Mattsee (AT); Georg Görg, St. Georgen (AT)

(73) Assignee: Bleckmann GmbH & Co. KG, Lamprechtshausen (AT)

( * ) Notice: Subject to any disclaimer, the term of this patent is extended or adjusted under 35 U.S.C. 154(b) by 133 days.

(21) Appl. No.: 16/557,288

(22) Filed: Aug. 30, 2019

(65) Prior Publication Data
US 2020/0076259 A1    Mar. 5, 2020

(30) Foreign Application Priority Data

Sep. 3, 2018 (EP) .................................. 18192238

(51) Int. Cl.
*H02K 3/18*  (2006.01)
*H02K 1/14*  (2006.01)
(Continued)

(52) U.S. Cl.
CPC .............. *H02K 3/18* (2013.01); *H02K 1/146* (2013.01); *H02K 3/02* (2013.01); *H02K 15/022* (2013.01); *H02K 2213/03* (2013.01)

(58) Field of Classification Search
CPC ........ H02K 3/28; H02K 3/38; H02K 2203/06; H02K 2203/09; H02K 2203/12; H02K 2213/03
(Continued)

(56) References Cited

U.S. PATENT DOCUMENTS

2004/0263015 A1   12/2004   Okada et al.
2008/0157610 A1*  7/2008    Watanabe .............. H02K 3/522
                                                    310/43
(Continued)

FOREIGN PATENT DOCUMENTS

JP    2014-11901 A    1/2014
JP    2014-128049 A   7/2014

OTHER PUBLICATIONS

EPO; Application No. 18192238.6; European Search Report dated Feb. 25, 2019.

*Primary Examiner* — Michael Andrews
*Assistant Examiner* — Minki Chang
(74) *Attorney, Agent, or Firm* — Fitch, Even, Tabin & Flannery LLP (57) ABSTRACT

A stator of an electric motor comprises a pole chain, which is made of a stack of a plurality of straight transformer sheets and rounded to a circular configuration by bending the stacked transformer sheets, wherein the pole chain has a plurality of pole portions each comprising a pole tooth; a plurality of winding cores attached to the respective pole teeth for accommodating coils of a three-phase winding comprising wires; wherein the wires of respective phases of the three-phase winding are routed spatially separated from each other and without mutual contact at an axial end surface of the pole chain between and along adjacent winding cores around the pole chain; and wherein the wires are supported and guided such that their positions relative to the pole chain are substantially maintained when the pole chain is rounded from its straight configuration to its circular configuration.

12 Claims, 12 Drawing Sheets

(51) Int. Cl.
*H02K 3/02* (2006.01)
*H02K 15/02* (2006.01)

(58) Field of Classification Search
USPC .......................... 310/215, 216.069, 105, 115
See application file for complete search history.

(56) References Cited

U.S. PATENT DOCUMENTS

| | | | |
|---|---|---|---|
| 2011/0020154 A1 | 1/2011 | Matsuda et al. | |
| 2012/0098384 A1* | 4/2012 | Wang | H02K 3/522 |
| | | | 310/260 |
| 2017/0141627 A1* | 5/2017 | Seki | H02K 1/148 |

* cited by examiner

| coil | level "a" | level "b" |
|---|---|---|
| 3c | 0 | +2 |
| 2c | 0 | +1 |
| 1c | 0 | 0 |
| 3b | +2 | +2 |
| 2b | +1 | +1 |
| 1b | 0 | 0 |
| 3a | +2 | +2 |
| 2a | +1 | +2 |
| 1a | 0 | +2 |

Fig. 15

ELECTRIC MOTOR WITH A STATOR FORMED FROM A POLE CHAIN AND WITH CONTACTLESS ROUTING OF ENAMELED ALUMINUM WIRE

CROSS-REFERENCE TO RELATED APPLICATION

The present application claims the benefit of priority of European Patent Application No. 18192238.6 filed on Sep. 3, 2018, the content of which is incorporated herein by reference in its entirety.

FIELD OF THE INVENTION

The present invention relates to the field of electric motors and methods of manufacturing of the same, and in particular to electric motors having a winding made from enameled aluminum wire on a stator that is formed by rounding a straight pole chain. Such motors may be used in household appliances as circulation pumps in washing machines or dishwashers, and may be constructed as brushless DC motors (BLDC motors).

BACKGROUND OF THE INVENTION

Electric motors are manufactured by separately winding an insulated electric conductor (preferably enameled copper wire) onto winding cores for each phase (for example phases U, V, W). When a winding of one coil on a winding core is completed, the insulated electric conductor is routed to the next winding core to wind the next coil of a phase. After the winding of all coils of a phase is completed, the insulated electric conductor is led out to a contacting point. All further phases are manufactured according to this operation sequentially or in parallel.

The iron core of the stator can be formed from initially straight pole chain comprising a plurality of stacked transformer sheets having a straight or linear configuration and comprising a number of pole teeth, wherein adjacent pole teeth are connected to each other via thin bending portions. The stacked iron core is rounded to its final circular configuration by bending at the bending portions and connecting the respective pole teeth at the end of the pole chain. The individual coils (windings) of the pole chain can be wound around the individual pole teeth in the linear or straight state of the pole chain, or in the rounded circular state of the pole chain. It is advantageous to wind the coils in the straight state of the pole chain, since the distance between the individual pole teeth is larger and there is more space available for wire laying tool, so that laying of the wires of the individual (three) phases and winding of the coils can be carried out easier and faster. If the pole chain is rounded after the winding of the coils, the width of the slot between adjacent pole teeth can be designed beneficially (smaller, for example) so as to result in a lower cogging torque of the motor, since it is not necessary to provide space for guiding the wire laying tool through the slot between adjacent pole teeth.

The coils are usually wound made of enameled copper wire. Enameled aluminum wire could be an alternative, but is considered to be difficult to handle normally requires a different design of the stator. The electric conductivity of a bare electric conductor is about 58.5 m/Ω·mm² for round copper wire (without insulation). The electric conductivity of aluminum is considerably less and is about 35.85 m/Ω·mm². Consequently, when using enameled round aluminum wire instead of copper wire, the wire cross-sectional area of the wire must be enlarged according to the ratio of the respective electric conductivities, in order to avoid increase of power loss and to enable a motor having similar power and temperature characteristics. In this case, the cross sectional area of an enameled aluminum wire should be increased by a factor of about 3/2 in comparison to a copper wire. As a result, the iron sheet stacks (iron core) and all mechanical components of the motor must be enlarged, too, in order to accommodate the enlarged wire volume.

Furthermore, the workability of enameled aluminum wire is limited in comparison to copper wire due to the elastic limit and tensile strength of the aluminum wire, as can be derived from table 1 showing some physical characteristics of typical copper and aluminum materials (E-CU and E-Al F7) used for enameled wires. Also the thermal management of the electric motor is affected in this context as regards the heat dissipation, for example.

TABLE 1

| physical characteristics | |
|---|---|
| E-Cu | E-Al F7 |
| specific weigth [g/cm³] | |
| 8.92 | 2.7 |
| electric. conductivity [m/Ω × mm²] | |
| 58.5 | 35.85 |
| tensile strength [N/mm²] | |
| ca. 200-290 | ca. 70-120 |
| 0.2 elastic limit [N/mm²] | |
| ca. 120-150 | ca. 20-60 |
| temperature coefficient [1/K] | |
| 0.00396 | 0.00407 |
| thermal conductivity [W/m° C.] | |
| 391.1 | 238.7 |

The insulation of the electric conductor (such as round copper or aluminum wire) is usually a coating or covering (e.g. varnish or enamel varnish, such as polyurethane, polyester imide, polyimide) for resisting the voltage and preventing short circuits between adjacent wires. The coating is subjected to considerable stress during the winding operation, in particular in bending and stretching areas of the wire. Moreover, the manufacturers of enameled wires indicate that the insulation coating of such wires initially has up to 40 defect points per 30 running meters. Such defect points, whether existing from the beginning or generated by stress during the wire laying process, are the most common source of motor failures due to electric short circuits. Between adjacent wire layers within a coil, the voltage difference is commonly only a few volts. Between the different phases of a motor, however, much higher voltages occur, so that any defect points of the wire coating may lead more likely to sparkovers and short circuits. The insulation coating of aluminum wires is more susceptible for such defects than copper wires due to the different material characteristics, as mentioned above. The costs of copper wire and aluminum wire vary remarkably with time, so that usage of aluminum wires for such motor windings is of economic interest.

SUMMARY OF THE INVENTION

It is the object of the present invention to improve the above described electric motor and to provide a design of an electric motor which enables to electively use aluminum or copper wires for the stator windings, while ensuring low rate of motor failure.

This object is solved by an electric motor as defined in the independent claim. The dependent claims are directed to advantageous further developments of the invention.

In a first aspect of the invention, a stator for an electric motor is provided which comprises a pole chain, which is made of a stack of a plurality of straight transformer sheets and rounded to a circular configuration by bending the stacked transformer sheets, wherein the pole chain has a plurality of pole portions each comprising a pole tooth; a plurality of winding cores attached to the respective pole teeth for accommodating coils of a three-phase winding comprising wires; wherein the wires of respective phases of the three-phase winding are routed spatially separated from each other and without mutual contact at an axial end surface of the pole chain between and along adjacent winding cores around the pole chain; and wherein the wires are supported and guided such that their positions relative to the pole chain are substantially maintained when the pole chain is rounded from its straight configuration to its circular configuration.

The wires may be routed in three axially separated routing planes having different axial levels along the axis of the rounded pole chain, wherein each wire (1, 2, 3) is routed substantially in a respective one of the planes. Alternatively, the wires can be routed in radially separated routing surfaces (cylinder surfaces).

Each winding core may optionally further comprise support means configured to support and guide the respective wire to a respective one of the separated routing planes when entering or exiting the coil on the winding core.

Additionally or alternatively, each winding core may further comprises support divider means which are formed as a recess in a coil space boundary wall of the winding core, the recess having a depth which is set so that a bottom line of the recess is located at the axial level of one of the routing planes. Optionally, at least one support divider means may further comprise a winding gradation means.

Additionally or alternatively, the winding core may further comprises a winding displacement means located at an inner side wall of the coil space of the winding core.

In some embodiments, each winding core may further comprise support pins which are configured to support and the guide wires from one winding core to adjacent winding cores along spatially separated routing paths. In some of the embodiments, the support pins may be configured to support and guide the wires from one winding core to adjacent winding cores in axially separated routing planes. The support pins may optionally comprise shoulders or recesses to support the wires and prevent axial movement of the wires. Additionally or alternatively, the support pins may have a fork configuration to separately support the wires and prevent axial movement of the wires.

In some embodiments, the support pins may be located such that the wires are guided from one winding core to an adjacent winding core along a path which passes nearby or intersects with a pivot axis about which adjacent pole teeth are pivoted when the pole chain is rounded to its circular configuration.

In some embodiments, a lateral side wall of a coil space of the winding core facing in circumferential direction of the stator has an inclination angle ($\gamma$) larger than an inclination angle ($\alpha$) of the narrow side of the coil space facing in axial direction of the stator, wherein a difference ($\beta$) between the angles ($\alpha$) and ($\gamma$) is preferably set to 5° to 25°, and more preferably set to 10° to 15°.

The wires of the three-phase winding may preferably be enameled wires made from aluminum or aluminum alloy.

In a second aspect, the invention provides a method of manufacturing a stator of an electric motor, comprising the steps: stacking a plurality of straight transformer sheets to form a stacked magnetic core in the form of a straight pole chain having a plurality of pole portions each having a pole tooth; attaching a separate winding core to each pole tooth; winding a plurality of wires on the respective winding cores, wherein the wires are wound alternatingly on consecutive winding cores to form a multiple-phase winding, and wherein the wires are routed from one winding core to adjacent winding cores along spatially separated routing paths; rounding the straight pole chain by bending it to a circular configuration and coupling opposing ends of the pole chain, wherein the wires are supported and guided at the pole chain such that their positions relative to the pole chain are substantially maintained while rounding the pole chain.

Preferably, the wires are routed between adjacent winding cores in axially separated routing planes. Alternatively, the wires can be routed between adjacent winding cores in radially separated cylindrical winding surfaces.

Further advantages and preferred embodiments of the present invention will be described in the following together with the drawings listed below. The expressions "left", "right", "below" and "above" used in the following description are referred to the drawings in an alignment such that the reference numbers and the notation of the figures used can be read in normal orientation.

DETAILED DESCRIPTION

Figure 1:
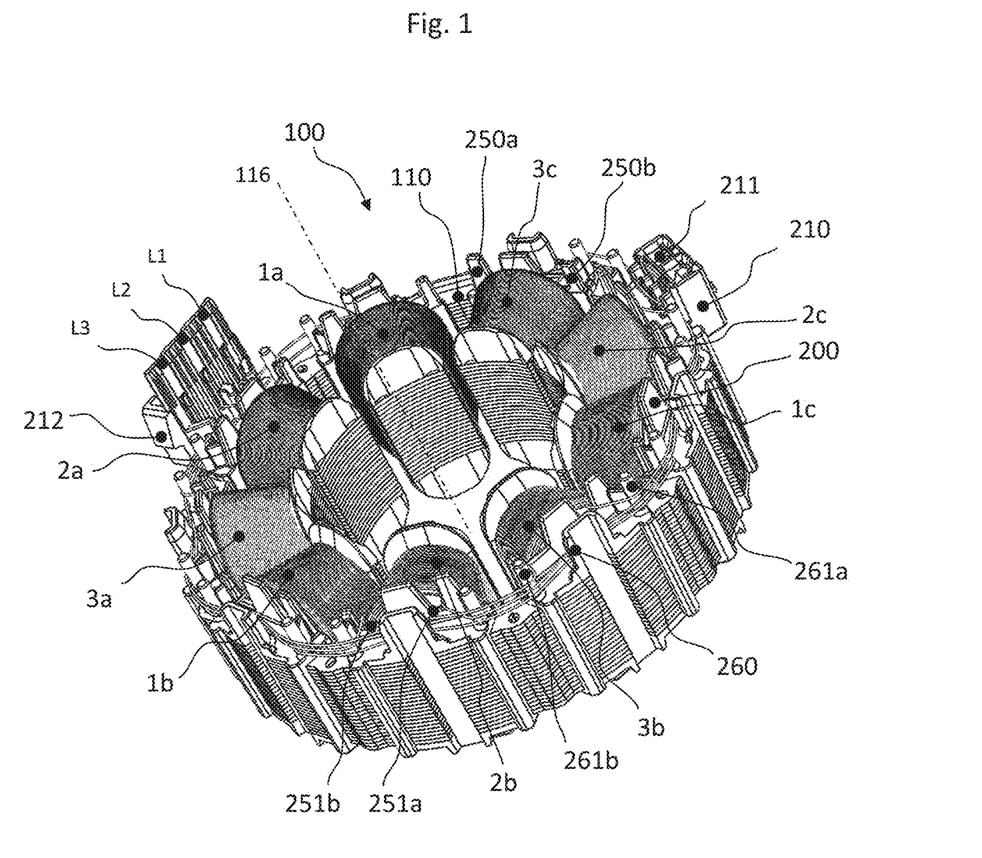
FIG. 1 is a perspective view of a stator of an electric motor according to the invention in its circular configuration.

With reference to FIG. 1, the present invention provides an electric motor having an outer stator 100 and an inner rotor (not shown). The rotor is preferably a permanent magnet rotor and the stator is preferably an electronically commutated three-phase stator so that the electric motor is a brushless direct current motor, commonly known as BLDC motor. Such electric motors can be used to drive recirculation pumps in dishwashers or laundry washing machines or similar household appliances, for example, or in industrial devices.

Figure 6:
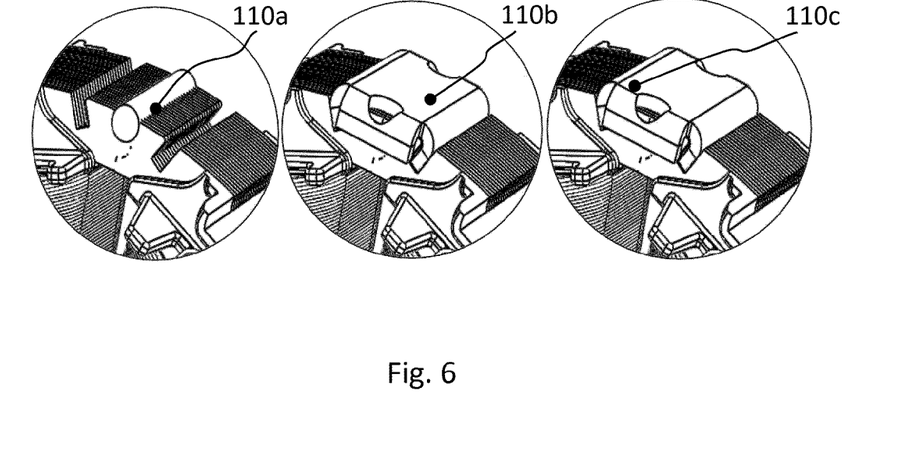
FIG. 6 is an enlarged view of a connection portion coupling the ends of the pole chain to each other after rounding the pole chain to its circular configuration.
Figure 13A:
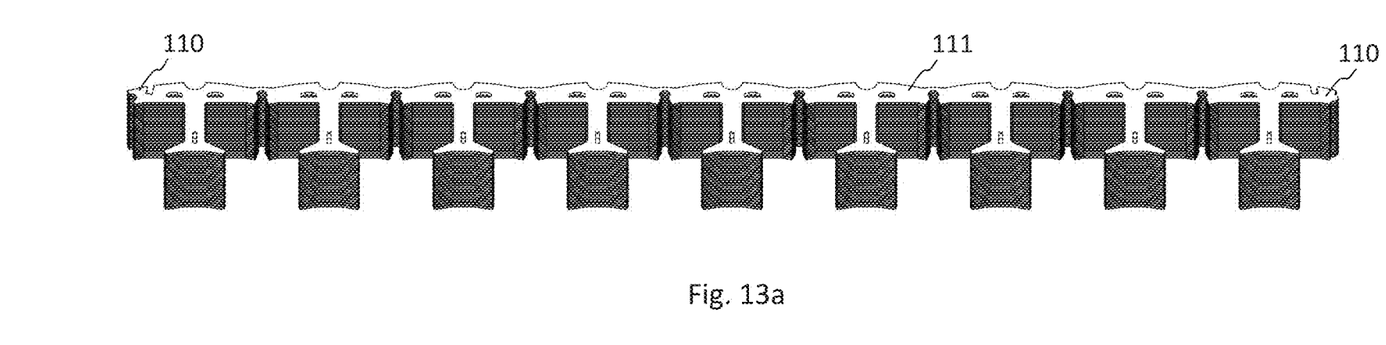
FIG. 13*a* is a perspective view of a stacked iron core of a straight pole chain according to the invention.
Figure 13B:
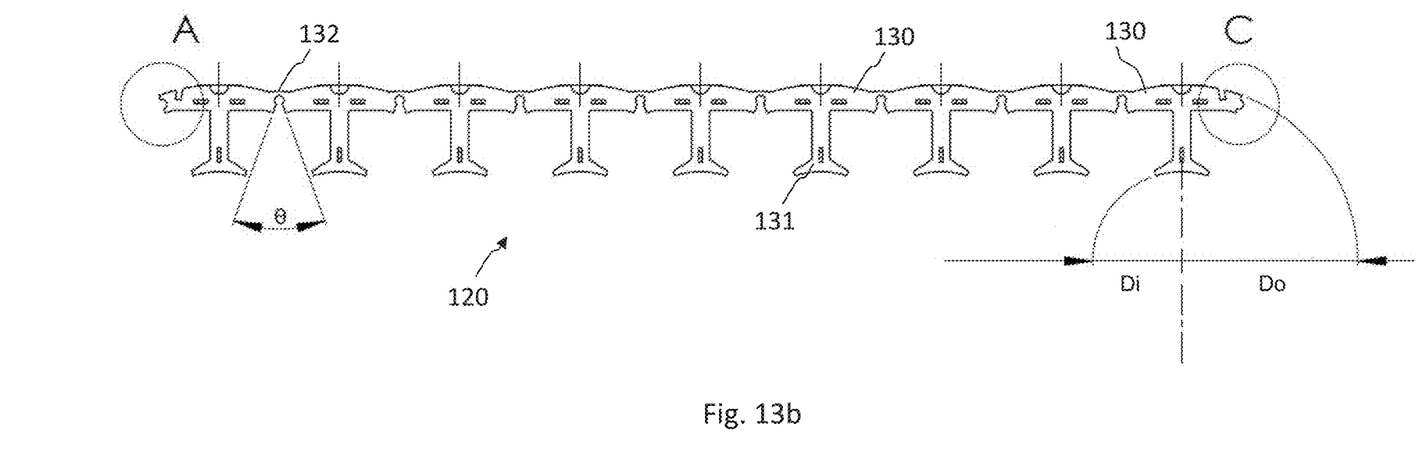
FIG. 13*b* is a plain view of a single iron sheet of the straight pole chain according to the invention.
Figure 13C:
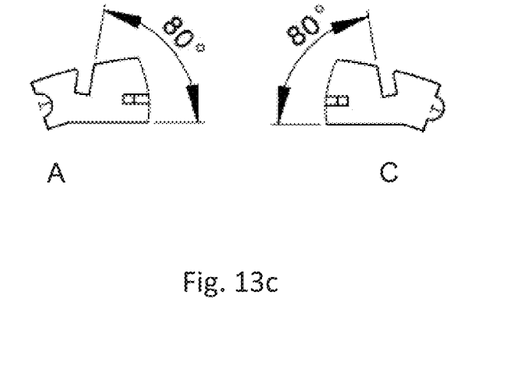
FIG. 13*c* is an enlarged view of the end sections of the iron sheet of FIG. 13*b*.

In particular, the invention provides a stator of an electric motor, wherein the stator is designed as a pole chain 100 which is formed from a stack 111 of transformer sheets 120, usually iron sheets, having initially a straight or linear configuration and forming the magnetic core of the stator. A stack 111 of iron sheets is shown in FIG. 13a, and a single iron sheet 120 is depicted in FIG. 13b. The iron sheets 120 comprise a plurality of pole portions 130 according to the number of poles of the stator pole chain 100. In the present embodiment, the pole chain comprises nine poles, however, any other number of poles is feasible, depending on the design of the electric motor. Each pole portion 130 is connected to adjacent pole teeth 130 via bending portions 132. When the straight pole chain 100 is rounded into its circular configuration to form the circular stator, the stack 111 of iron sheets 120 is bent at the respective bending portions 132, and the opposing ends of the pole chain are coupled to each other at a join connection 110, which is depicted in detail in FIG. 13c. The join connection portion 110 of the iron sheets 120 have a recess inclined by 80° with respect to the inner base line of the pole portion, so that a clamp 110b can engage and couple both ends of the pole chain to each other, as shown in FIG. 6. Additionally or alternatively, the join connection 110 can be fixed by point welding 110a, 110c, or other coupling technics. The preferred usage of point welding 110a, 110c in combination with a clamp 110b is advantageous as regards stability and reliability.

Figure 10:
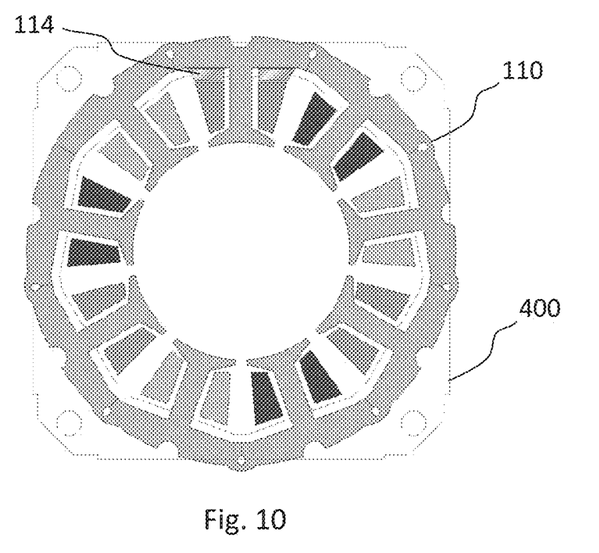
FIG. 10 is a schematic cross-sectional view of a stator according to the present invention.
Figure 11:
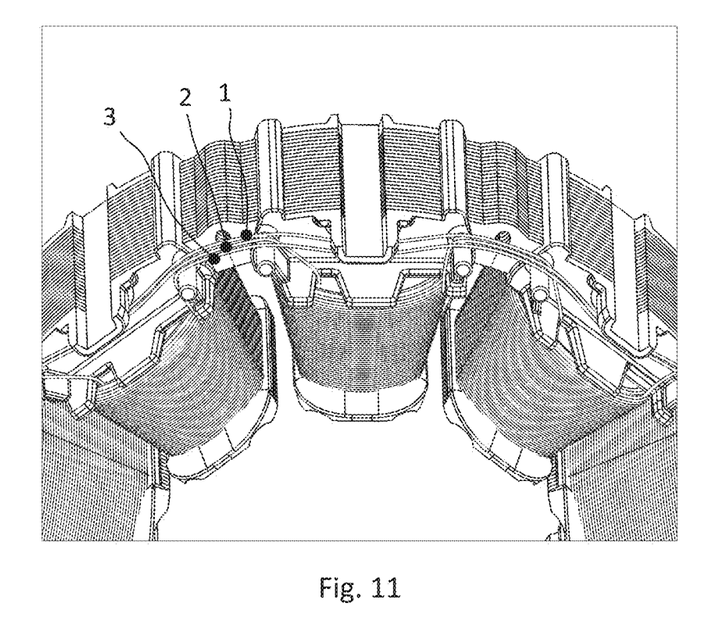
FIG. 11 is a perspective view of a part of the stator according to the invention.

Each pole portion 130 has a pole tooth 131 which forms an inner pole surface facing to the rotor and, after rounding the pole chain to its circular configuration, forming the inner surface of the stator with an inner diameter Di. The curved opposite side of the pole portion 130 then forms the outer surface of the stator with a diameter of Do. The bending portion 132 between adjacent pole teeth 131 comprise a relative thin bridge of iron sheet material which can be bent without separating adjacent pole teeth 131, and an angular recess facing to the side of the pole teeth and having an opening angle θ which is approximately θ=360°/n, wherein n is the number of poles. In the present embodiment, this results in θ=40°, so that in the rounded configuration, the side surfaces of the angular recess abut to each other, leaving a virtually no gap between the side surfaces of adjacent pole teeth. This provides good magnetic characteristics and ensures high power on low power losses of the electric motor without requiring additional means for improving the magnetic flux in the magnetic circuit, such as additional outer magnetic ring elements. A schematic depiction of the rounded pole chain 100 is shown in FIG. 10. The pole chain design of the stator 100 is advantageous in comparison to common rectangular iron sheet stacks 400, as shown in FIG. 10 by the thin outer contour, because less iron material is needed in total to obtain electric motors with similar power characteristics. Moreover, the inner diameter of the outer magnetic circuit can be made larger, so that there is more space for accommodating the winding coils. In FIG. 10, the additional space for the winding coils is depicted by the hatched area 114.

Figure 2:
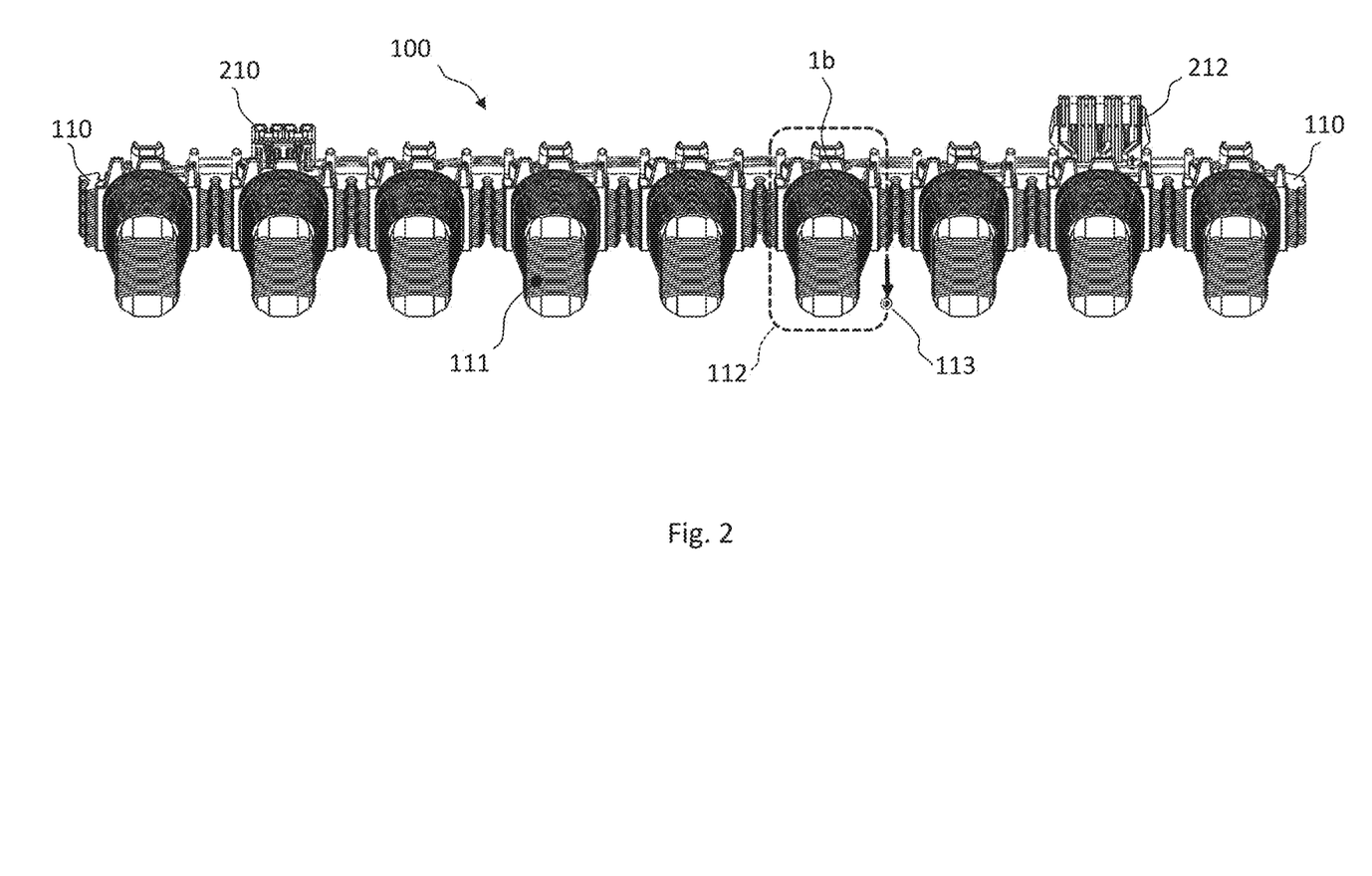
FIG. 2 is a perspective view of a straight pole chain of the stator of FIG. 1 after winding the coils and before rounding the pole chain to its circular configuration.

The pole chain design of stator 100 facilitates remarkably the winding operation, since there is much more space between adjacent pole teeth 131 of the straight pole chain 100 than in a common rectangular iron core design 400, so that a winding tool tip 113 can be moved easier and faster on a path 112 around each pole tooth 131, as shown in FIG. 2. This also requires less complex winding tools and machines, improving reliability and reducing costs of the manufacturing process of the stator 100. Moreover, this enables usage of aluminum wires with larger diameter, while the number of winding turns on each winding core can be kept unchanged in comparison to usage of copper wires. Thus, the winding space between adjacent pole teeth 131 of the rounded pole chain 100 can be utilized to a higher degree (higher filling factor), enabling free choice between copper and aluminum wires without requiring a larger diameter of the stator. Thus, it is not necessary to enlarge the entire electric motor and associated components.

Figure 3:
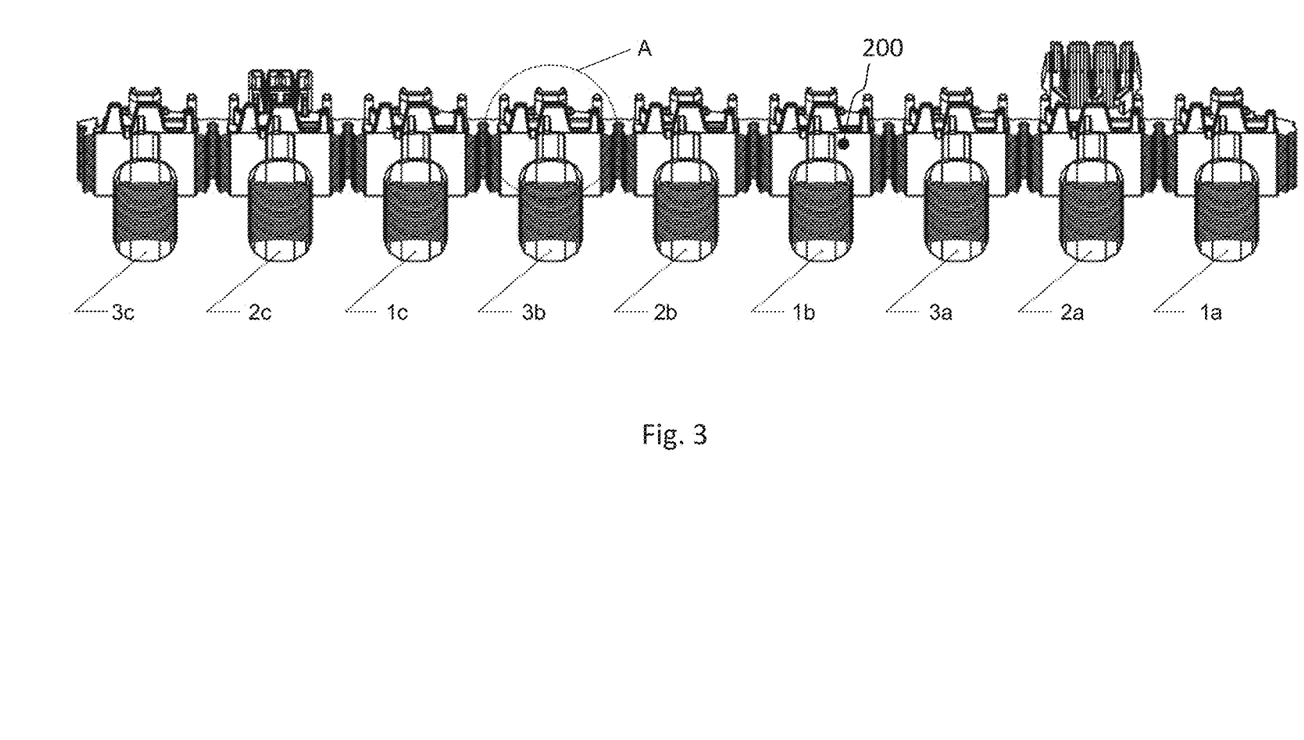
FIG. 3 is a perspective view of a straight pole chain of the stator of FIGS. 1 and 2 carrying winding cores before the winding operation.

The stator 100 of the present invention is manufactured by stacking a plurality of iron sheets 120 to form a straight stack 111 of a pole chain, as shown in FIG. 13a. Subsequently, the pole tooth 131 of each pole portion 130 is provided with an individual winding core 200 which is preferably made of plastic or other insulating materials. Preferably, the winding core 200 is injection molded around the pole tooth, in order to provide enhanced heat transfer characteristics between the coil and the iron core, as well as a high stability of the final stator. It is also feasible to form the winding core 200 from two or more pieces which are then mounted to the pole tooth 131 by snap connection or any other joining method. A resulting pole chain comprising the iron core stack 111 and nine winding cores for nine poles is shown in FIG. 3. Preferably, two of the windings cores 200 have a respective holder for contact terminal used to connect the stator 100 to an external driving circuitry, such as a star point terminal holder 210 and a phase terminal holder 212, denoted in FIG. 2. The star point terminal holder 210 and the phase terminal holder 212 can be formed integrally with the winding core 200, or can be separate elements which can be attached to the main body of the winding core 200 via dovetail coupling, for example. In the present embodiment, the stator pole chain 100 comprises nine pole teeth 131 which are associated to three phases L1, L2, L3 of a three-phase winding. In particular, the consecutive series of pole teeth 131 is alternatingly associated to the three phases. In other words, the coils on pole teeth 1a, 2a, 3a of FIG. 3 are associated to phase L1 and are wound with a single continuous wire 1 which passes the intermediate pole teeth of the other phases when it is routed from pole tooth 1a to pole tooth 1b, and so on. Accordingly, the coils on pole teeth 2a, 2b, 2c are wound with a single continuous wire 2, while the coils on pole teeth 3a, 3b, 3c are wound with a single continuous wire 3. The straight configuration of the pole chain 100 allows at least partially simultaneous winding operations of the three phases L1, L2, L3 using two or three winding tools.

In the present embodiment, preferably a star connection or Y-connection of the three phases L1, L2, L3 is used. However, also other configurations such as a delta connection can be used also with minor adaptions. When winding a single phase L1, for example, wire 1 is connected to the star point terminal 211 at the star point terminal holder 210 and routed to the first pole tooth 1c to wind the coil 1c on the respective winding core 200. Subsequently, the wire 1 is routed to pass pole teeth 3b and 2b and arrive at pole tooth 1b, where the second coil 1b of phase L1 is wound around the respective winding core 200. After passing pole teeth 3a and 2a, the wire is routed to pole tooth 1a to wind the last coil 1a of phase L1, and is finally routed to terminal L1 at phase terminal holder 212. Subsequently, or simultaneously, wires 2 and 3 are routed along the pole chain 100 from star point terminal 211 via the respective pole teeth 2c, 2b, 2a and 3c, 3b, 3a to phase terminals L2 and L3 in a similar manner as wire 1. The direction of routing can also be inverted, so that routing and laying of wires 1, 2, 3 starts at the phase terminals L1, L2, L3 and ends at the star point terminal 211. The connection technique used at the terminals is preferably the insulation displacement technique in which contact blades cut through the wire coating and establish electric contact when the wire is clamped between those blades. This enables quick and reliable contacting of the wires at the terminals, while the number of contact terminal is kept at a minimum to enhance reliability of the electric motor.

Finally, after winding of all three phase is completed, the straight pole chain 100 is rounded to its circular form by bending it at the bending portions 132 or the iron sheets 120 and coupling the opposing end of the pole chain 100 at the join connection 110.

Preferably, wires 1, 2, 3 are routed between the individual coils 1a, 1b, 1c, 2a, 2b, 2c, 3a, 3b, 3c such that the wires do not touch each other. In other words, wires 1, 2, 3 are routed contactless along the sequence of respective winding cores 200, so that wires 1, 2, 3 are spatially separated from each other over the entire routing path. This prevents any short circuits between phases L1, L2, L3 which else may result due to defects of the insulation coating of the enameled wires 1, 2, 3 and the high voltages occurring between those phases. The spatial distance between wires 1, 2, 3 can be an air distance between the enameled wire surfaces, in the simplest form, or can be provided by an additional insulation means which is preferably formed from the same material as the winding core.

Contactless routing of wires 1, 2, 3 along the pole chain 100 can be obtained by different means, which are described in the following and can be used alone or in combination, respectively.

Spatial distance between wires 1, 2, 3 can be preferably obtained by routing the wires in substantially in separated planes with different axial positions with respect to the axis of the rounded stator 100. Additionally or alternatively, it is also possible to route wires 1, 2, 3 substantially in separated cylinder surfaces to obtain spatial distance between them.

Figure 5:
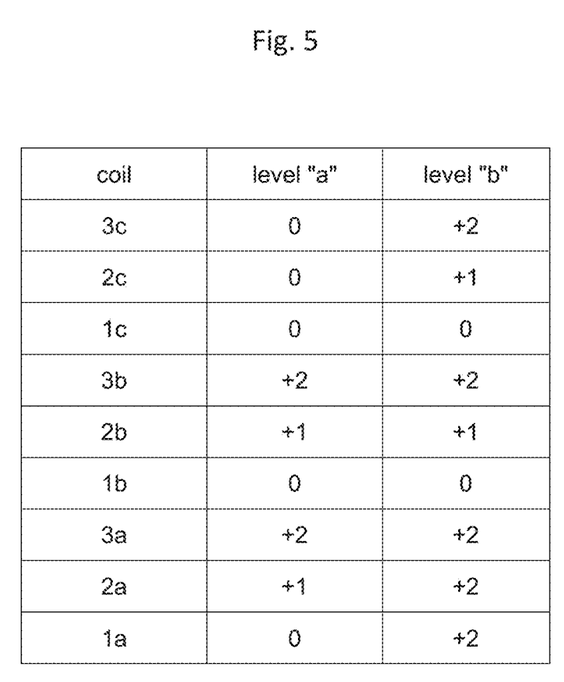
FIG. 5 is table showing a level scheme of the support means dividers according to the invention.
Figure 8:
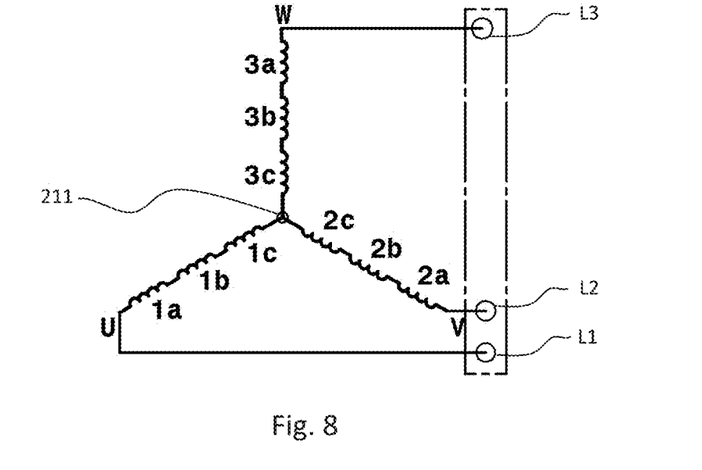
FIG. 8 is a circuit diagram showing the interconnection of the individual coils of the three phases of the motor.

In a preferred embodiment of the stator 100, wires 1, 2, 3 of the three phases U, V, W are laid and routed according to a winding scheme which is explained in the following in connection with FIGS. 5 and 8. With this scheme, wire 1 is routed from the star point terminal 211 to enter winding core 200 of coil 1c within a plane having an axial position or level "a"=0, wherein 0 is the axial distance with respect to an arbitrarily defined reference point on the motor axis. Wire 1 then exits coil 1c within the same plane having an axial position or level "b"=0 and is routed within this plane to enter next coil 1b also at this level "a"=0. In other words, level "a" represents the axial position of the wire when entering a coil, and level "b" represents the axial position of the wire when exiting a coil. Subsequently, wire 1 exits coil 1b at level 0 and is routed at this level to enter last coil 1a of phase L1. Wire 1 exits coil 1a in a plane at level +2, which means that this plane is axially shifted by two units, wherein on unit represents the desired minimum of the spatial distance between the wires of different phases. In a similar manner, wire 2 is routed from the star point terminal 211 to enter coil 2c at level 0, exits coil 2c at level +1, is routed to enter coil 2b at level +1, exits coil 2b at level +1 to be routed at this level to enter coil 2a, and finally exits coil 2a at level +2, at which level it is routed to the phase terminal L2. Furthermore, wire 3 is routed from the star point terminal 211 to enter coil 3c at level 0, exits coil 3c at level +2, is routed to enter coil 3b at level +2, exits coil 3b at level +2 to be routed at this level to enter coil 3a, and finally exits coil 3a at level +2, at which level it is routed to the phase terminal L3. This winding scheme ensures that the routing planes of wires 1, 2, 3 are kept constant along substantially the entire pole chain 100, so that the wires do not need to cross each other or to swap routing planes, which enables a fast and simple laying operation. A similar routing scheme can be achieved laying the wires in different cylindrical surfaces having radial distances with levels 0, +1 and +2, for example.

Routing of wires 1, 2, 3 within axially separated planes from one coil to another coil is obtained by using a plurality of wire guiding and supporting means, which are preferably integrally formed with the windings cores 200, so that wires 1, 2, 3 are hold in place when rounding the straight pole chain 100 to its circular configuration after the winding operations are completed.

Figure 12:
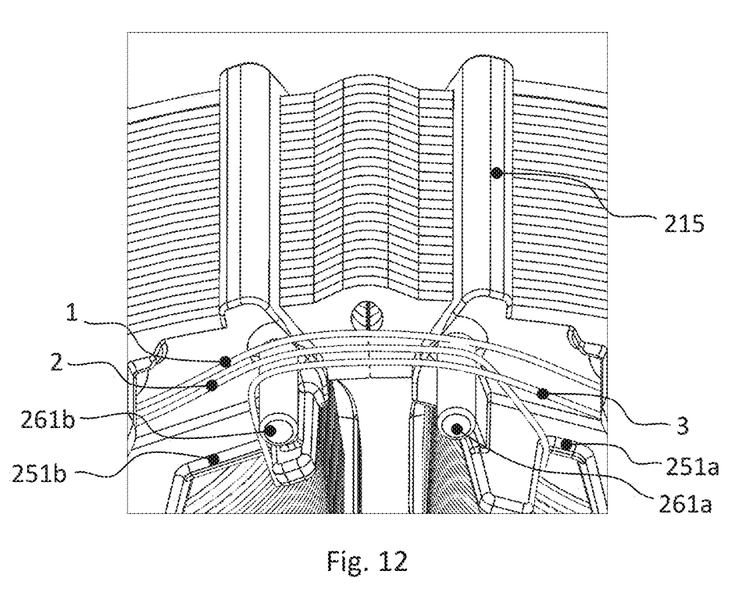
FIG. 12 is a perspective view showing the contactless wire laying between the coils of the stator.

In a preferred embodiment, each winding core 200 comprises support pins 261a, 261b as supporting means, which support the wires 1, 2, 3 at dedicated points along the route between two adjacent coils. Two support pins 261a, 261b are shown in FIG. 12, for example, and are configured to support several wires in different planes or axial levels, as explained above. However, more or less support pins can be provided to achieve the effect.

The support pins 261a, 261b may comprise shoulders or may have different diameters at different axial levels or may have a conical shape to improve engagement of the wires and prevent undesired movements of the wires. Additionally or alternatively, support pins 261a, 261b may have a fork configuration to accommodate and support the wires in a spatially separated manner. The support pins 261a, 261b are preferable located such that wires 1, 2, 3 are guided from winding core 200 of one pole tooth 131 to winding core 200 of an adjacent pole tooth 131 on a path passing nearby or intersecting with a pivot axis about which adjacent pole teeth 131 are pivoted when rounding pole chain 100 to its circular configuration, so that the tension of wires 1, 2, 3 is substantially not changed and the wires are kept in position securely. Alternatively, it may be preferred to arrange the support pins 261a, 261b such that the tension of wires 1, 2, 3 is slightly increased or decreased, for example, to obtain a specific tension considered desirable with respect to expected thermal expansion of the wires during operation of the electric motor. Wires 1, 2, 3 can be routed via the support pins 261a, 261b by only partially surrounding them, or can be wound around the pins with more than one turn. The latter option enables the support pins 261a, 261b to provide a strain release effect, so that any tension in one wire portion is at least not fully transferred to the adjacent wire portion. Moreover, by winding a wire more than on turn around a pin, undesired axial movements of the wires are impeded. Laying a wire more than one turn around a pin and/or changing the winding direction around the pin between different wires 1, 2, 3 of different phases L1, L2, L3 also enables to vary the routing plane and to further change the distance between wires of different phases, if desired. A further guiding means 260 can be provided at each winding core 200 and can be located such that in particular those two wires of wires 1, 2, 3, which are passing the respective winding core 200 and do not enter the winding space or coil of this winding core, are guided over guiding means 260 between the support pins 261a, 261b, in order to improve the supporting function by increasing the wire tension and/or the contact angle of the wires around the support pins 261a, 261b. Guiding means 260 may be configured to be resilient and apply a desired tension to the guided wires. The support pins 261a, 261b and/or the guiding means 260 may have one or more grooves or recesses which extend substantially perpendicular to the axis of the rotor, in order to improve the support function and to impede axial movement of the wires.

Figure 4:
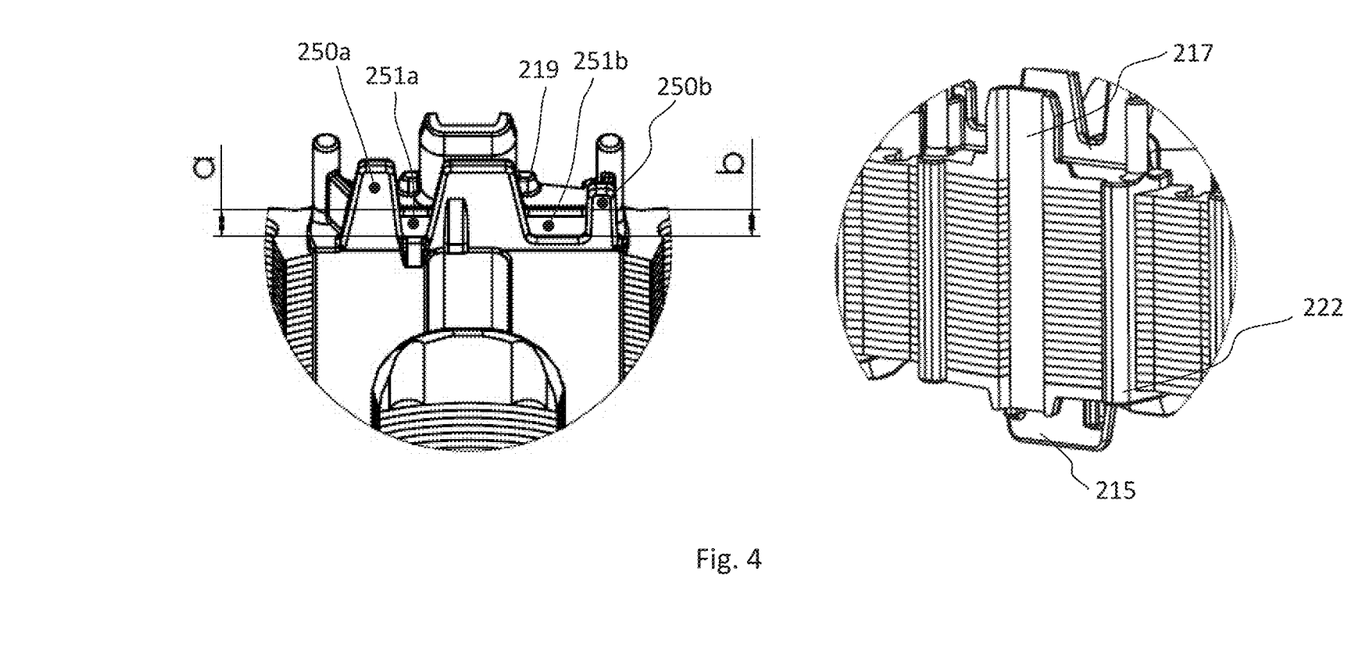
FIG. 4 is an enlarged view of the marked section of FIG. 4 showing details of a winding core.

In another embodiment, which may be combined with the above embodiments, the winding core 200 comprises support means 250a, 250b adjacent to the winding space or coil space receiving the coil, as shown in FIGS. 4 and 12 for example. Support means 250a is located circumferentially on one side of the pole tooth 131 and supports and guides the wire entering the coil, while support means 250b is located on the opposite side with respect to the pole tooth 131 and supports and guides the wire exiting the coil. Support means 250a, 250b are preferably part of the coil space boundary portions defining and limiting the space in which the coil is wound around the pole tooth 131, and are separated or defined, respectively, with respect to the remaining coil space boundary portion by recesses forming support means dividers 251a, 251b. In this case, the respective wire 1, 2, 3 is routed from support pin 261a to support means 250a and the bottom line of support means divider 251a to enter the coil space. The wire is exiting the coil space and supported and guided by support means divider 251b and support means 250b and further routed to support pin 261b in direction to the next winding core 200 of the adjacent pole tooth 131. In order to route the wire from/to the desired routing plane having a specific level "a" or "b", the support means dividers 251a, 251b are preferably configured such that the respective recess depth is adapted to the desired routing level "a" or "b". In other words, in a preferred further development of this embodiment, the individual winding cores 200 have differently formed support means dividers 251a, 251b so that the wires enter and exit the coil space at the desired axial level. Thus, winding core 200 of coil 3c, for example, has a deep recess at support means divider 251a providing a routing level "a"=0, and a shallow recess at support means divider 251b providing a routing level "b"=+2, while winding core 200 of coil 2b has recesses of the same medium depth at both support means dividers 251a, 251b for providing the same routing level "a"="b"=+1, which can be derived from the table in FIG. 5.

The support means 250a, 250b and the support means dividers 251a, 251b are preferably arranged and shaped such that they can provide strain relief effects to assure a desired tension of the wires 1, 2, 3, aside from guiding functions described above, and may improve air circulation through the stator 100 by providing openings and passages for guiding air flows through the stator 100.

Figure 14:
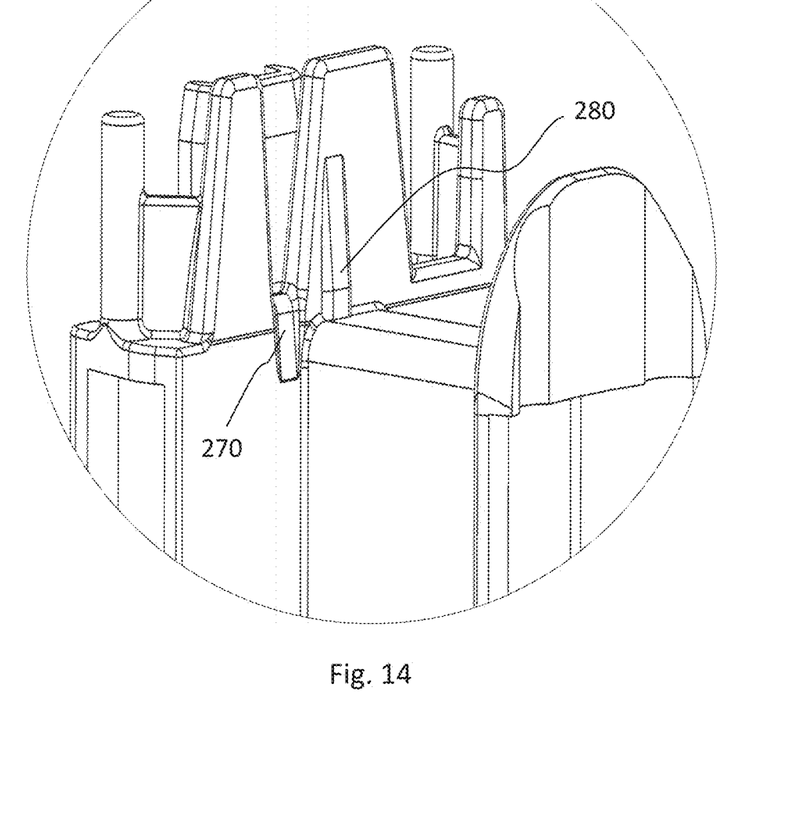
FIG. 14 is an enlarged view of a portion of the winding core according to the invention.
Figure 15:
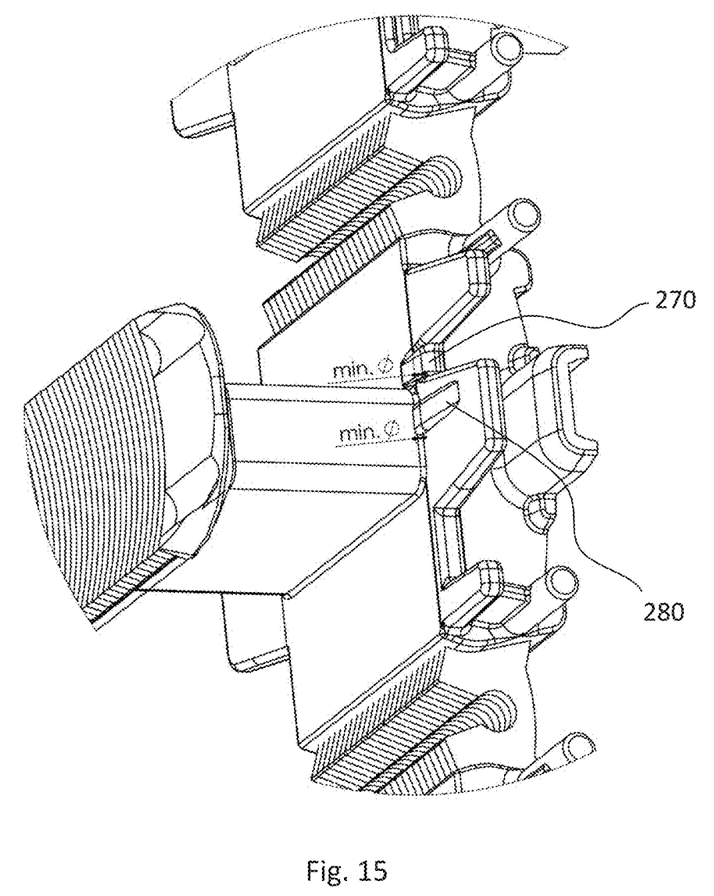
FIG. 15 is a perspective view of a single winding core mounted on the iron core of a straight pole chain.

In a further development of the winding core 200, which can be combined with the above described embodiments of the stator 100, the winding core 200 comprises winding gradation means 270 and winding displacement means 280 which enable the respective wire 1, 2, 3 to enter the coil space of a winding core 200 without applying undesired stress to the wire and its coating by stretching and squeezing. Such stretching or squeezing can occur when the entering wire is covered by following layers of winding turns. To avoid such undesired stress onto the entering wire, support means divider 251a may preferably have a recess or winding gradation means 270 in the form of an inclined channel having an initial depth of at least one wire diameter, as shown in FIGS. 14 and 15, so that the wire is gradually led into the coil space substantially in winding direction (and not perpendicular to winding direction) and is not subjected to a sharp bending or kink. The following layers of winding turns of the wire can then be laid smoothly adjacent the entering wire without applying any undesired stress onto the same. The channel shape of winding gradation means 270 may have a suitable width of more than one wire diameter so that the wire can move laterally within the channel before it is covered by following winding turns and can thus compensate thermal expansion of the wire outside the coil.

Alternatively or additionally to winding gradation means 270, winding core 200 may comprise winding displacement means 280 in the form of an inclined projection at the inner surface of the coil space boundary portion (wall) of winding core 200, having a maximum protrusion height of at least one wire diameter and decreasing in height in direction to the outer surface of the coil, as shown in FIGS. 14 and 15. Winding displacement means 280 is configured to push or displace the following layers of winding turns away from the entering wire, so that they cannot apply undesired stress onto the entering wire. The winding gradation means 270 and the winding displacement means 280 reduce or prevent any decrease of the cross-sectional area of the wire when entering the coil space or during the winding of following winding layers. Such decrease of the cross-sectional area of the entering wire could be caused also by thermal stress during operation of the electric motor, resulting in varying wire tension or in wire movements.

Figure 9:
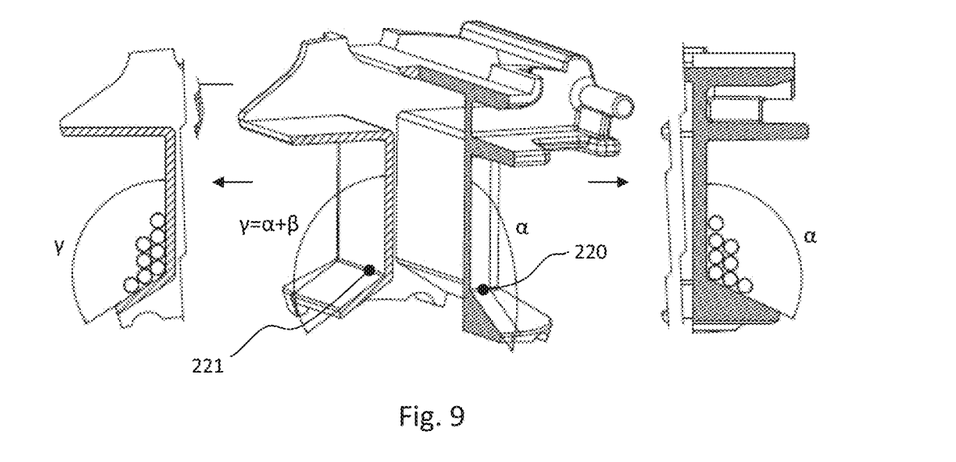
FIG. 9 is a partially cut-out view showing cross-sections of a winding core according to the invention.

As shown in FIG. 9, in another embodiment of the invention which can be combined with the above embodiments, the winding core 200 of the previously described embodiments may have differently inclined coil space (winding space) boundary walls at the lateral sides facing to the adjacent pole teeth 131 in comparison to the narrow sides facing in axial directions. In particular, an angle $\gamma$ at meeting line 221 of the lateral side wall and the bottom of the winding space is larger by angle $\beta$ than an angle $\alpha$ at the meeting line 220 of the narrow side wall and the bottom of the winding space, as shown in FIG. 9, so that $\gamma=\alpha+\beta$. The difference $\beta$ between those angles is preferably set to be 5° to 25°, and more preferable to be 10° to 15°. In this manner, the winding space is enlarged at the lateral sides of the pole tooth, i.e. there is more winding space, so that a more uniform laying of the winding layers can be achieved. Thus, a more uniform "orthocyclical" winding can be obtained having less bulging at the lateral sides of the coil.

Figure 7:
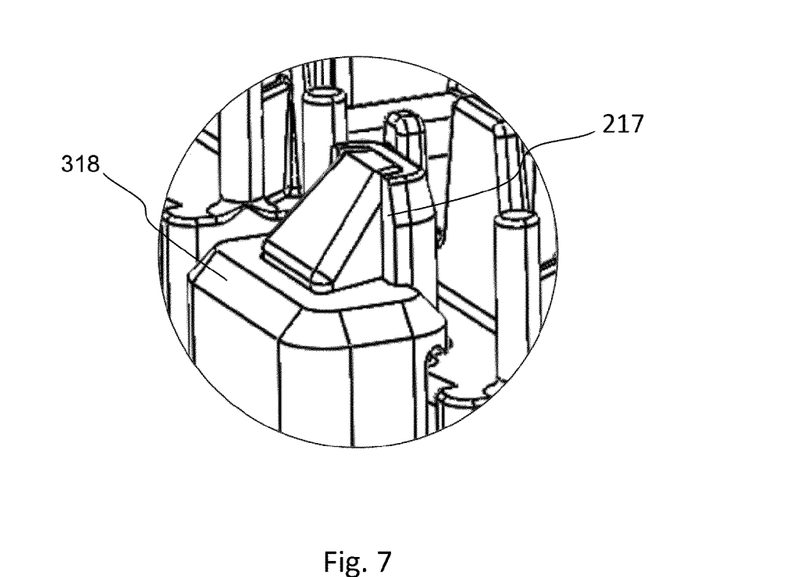
FIG. 7 is an enlarged view showing a work piece picker tool engaging a pick-up groove of a winding core.

In another embodiment, the winding core 200 comprises a pick-up slot or groove 217 at the outside of the rounded pole chain 100. The pick-up slot is configured to engage with a work piece clamp 318 which holds the pole chain 100 during the winding operation and/or during the bending when rounding the pole chain 100 to its circular configuration, as shown in FIGS. 4 and 7. Additionally, positioning shoulders 219 can be provided at the winding cores, which are also engaged by a work piece clamp or holder 318. In combination with an optional support web 215 provided at narrow side of the winding core 200, and optional winding core ridges 222 at the outside of the rounded pole chain 100, handling of the pole chain 100 during the entire manufacturing process is improved both in its straight and its circular configuration, because when depositing the pole chain 100 on a surface between two processing steps, the protruding ridges 222 and the protruding support web 215 prevent the enameled wires 1, 2, 3 from touching the surface which could damage the wires and their insulation coating. Moreover, the support web 215 and the winding core ridges 222 may also be used to transfer axial forces and/or circumferential forces to other components of the motor by form-fit or force-fit, so that driving forces created during operation of the electric motor can be received and appropriately deduced.

Each of the above described embodiments and the respective individual features, singly or in combination, enable or facilitate the optional usage of aluminum wire instead of copper wire without increasing the total size of the stator of the electric motor and without increasing the failure rate of the electric motor by reducing the probability of insulation defects and short circuits due to the more challenging handling characteristics of aluminum wires. The present invention enables the manufacturer of an electric motor, such as a BLDC motor, to alternatively use aluminum wires or copper wires with the same design of a stator or electric motor of the same design and construction. Aluminum wires or enameled aluminum wires may also comprise wires made of aluminum alloys. Also self-bonding wires may be used as wires 1, 2, 3.

The stator of the present invention may be used for electric motors having an internal rotor. The design of the pole chain 100 may be adapted such that the above described embodiments can also be realized with an electric motor having an external rotor (in this case, after rounding the pole chain to its circular configuration, the pole teeth face radially outward). The electric motor can be an AC motor or an DC motor, and can be electronically commutated. An electric motor having a stator according to the invention can be designed as a wet rotor pump comprising a rotor can in the gap between the stator and the rotor.

The invention claimed is:

1. A stator for an electric motor, comprising:
a pole chain made of a stack of a plurality of straight transformer sheets and rounded to a circular configuration by bending the stacked transformer sheets, wherein the pole chain has a plurality of pole portions each comprising a pole tooth;
a plurality of winding cores attached to the respective pole teeth for accommodating coils of a three-phase winding comprising wires;
the wires of respective phases of the three-phase winding are routed spatially separated from each other and without mutual contact at an axial end surface of the pole chain between and along adjacent winding cores around the pole chain;
wherein the wires are supported and guided such that their positions relative to the pole chain are substantially maintained when the pole chain is rounded from its straight configuration to its circular configuration;
wherein a lateral side wall of a coil space of each of the winding cores facing in a circumferential direction of the stator has an inclination angle (γ) larger than an inclination angle (α) of a narrow side of the coil space facing in an axial direction of the stator.

2. The stator according to claim 1,
wherein each of the winding cores further comprises a winding displacement means located at an inner side wall of the coil space of the winding core.

3. The stator according to claim 1,
wherein each winding core further comprises support pins which are configured to support and guide wires from one winding core to adjacent winding cores along spatially separated routing paths.

4. The stator according to claim 3,
wherein the support pins are configured to support and guide wires from one winding core to adjacent winding cores in axially separated routing planes.

5. The stator according to claim 3,
wherein the support pins comprise shoulders or recesses to support the wires and prevent axial movement of the wires.

6. The stator according to any of claim 3,
wherein the support pins have a fork configuration to separately support the wires and prevent axial movement of the wires.

7. The stator according to any of claim 3,
wherein the support pins are located such that the wires are guided from winding core to an adjacent winding core along a path which passes nearby or intersects with a pivot axis about which adjacent pole teeth are pivoted when the pole chain is rounded to its circular configuration.

8. The stator according to claim 1,
wherein the wires are enameled wires made from aluminum or aluminum alloy.

9. The stator according to claim 1,
wherein the wires are routed in three axially separated routing planes having different axial levels along the axis of the rounded pole chain, wherein each wire is routed between the coils in a respective one of the planes.

10. The stator according to claim 9,
wherein each winding core further comprises support means configured to support and guide the respective wire to a respective one of the separated routing planes when entering or exiting the coil on the winding core.

11. The stator according to claim 9,
wherein each winding core further comprises support divider means which are formed as a recess in a coil space boundary wall of the winding core, the recess having a depth which is set so that a bottom line of the recess is located at the axial level of one of the routing planes.

12. The stator according to claim 11,
wherein at least one support divider means further comprises a winding gradation means.

* * * * *